G. E. HULSE.
AXLE DRIVEN TRANSMISSION MECHANISM.
APPLICATION FILED MAY 6, 1919.
1,428,693.
Patented Sept. 12, 1922.
4 SHEETS—SHEET 4.
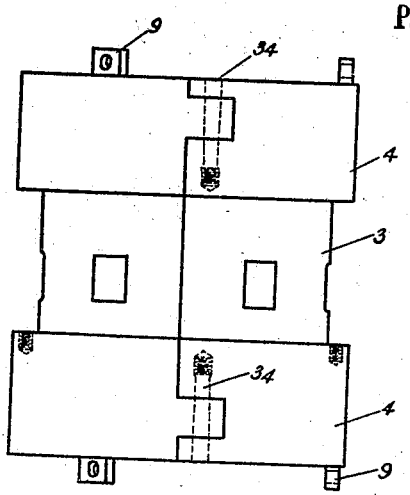
Fig. 7.
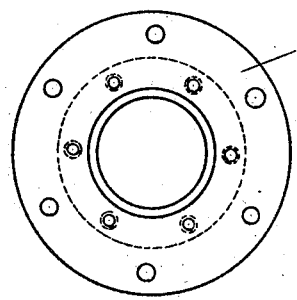 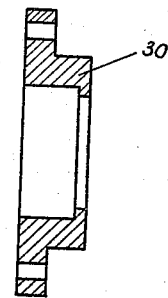
Fig. 8. Fig. 9.
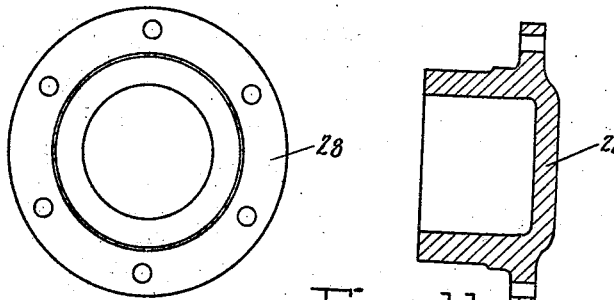 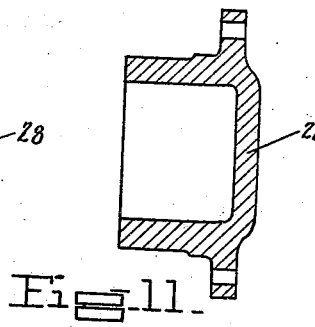
Fig. 10. Fig. 11.
INVENTOR
G. E. Hulse
BY
Dull, Warfield & Dull
ATTORNEY Patented Sept. 12, 1922.

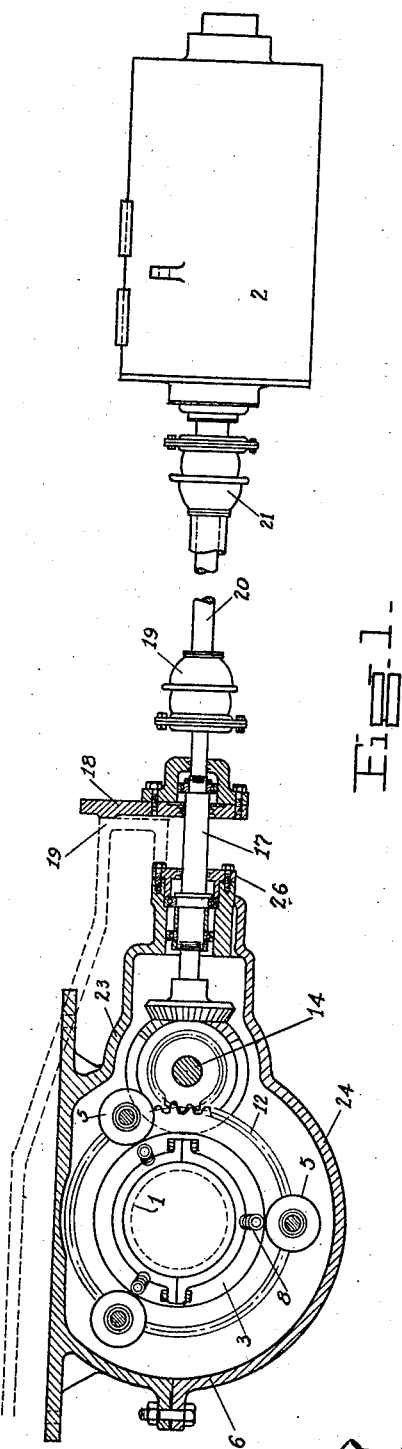

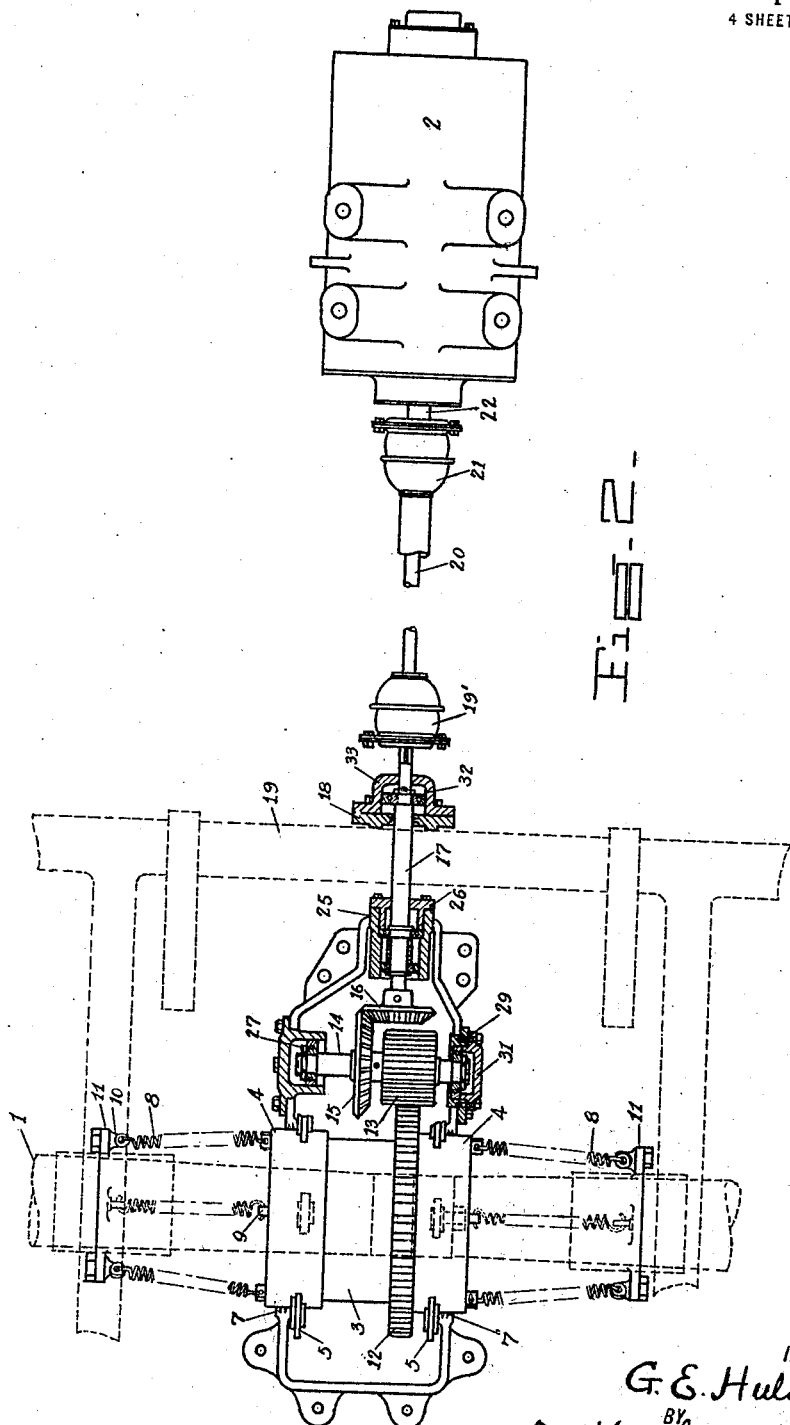

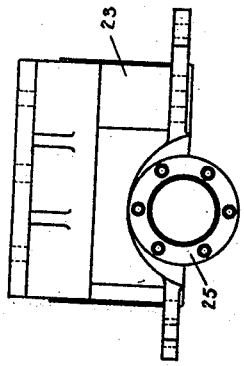
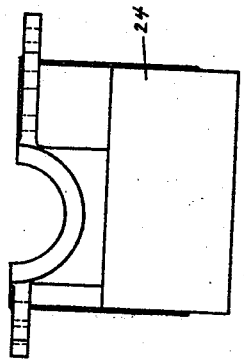
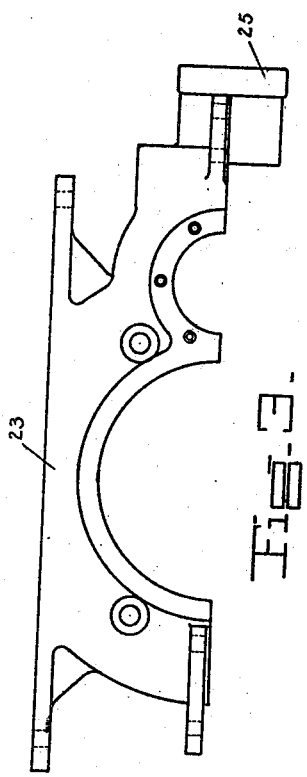
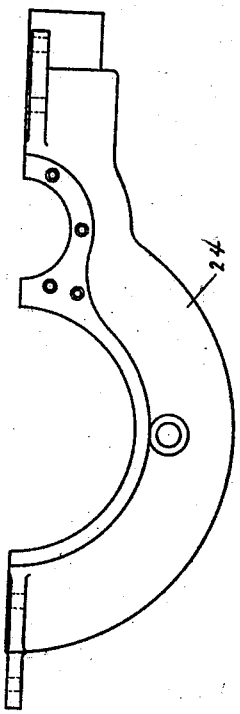

1,428,693

UNITED STATES PATENT OFFICE.

GEORGE EGBERT HULSE, OF NEWARK, NEW JERSEY, ASSIGNOR TO SAFETY CAR HEATING & LIGHTING COMPANY, A CORPORATION OF NEW JERSEY.

AXLE-DRIVEN-TRANSMISSION MECHANISM.

Application filed May 6, 1919. Serial No. 295,190.

*To all whom it may concern:*

Be it known that I, GEORGE E. HULSE, a citizen of the United States, residing at Newark, in the county of Essex and State of New Jersey, have invented certain new and useful Improvements in Axle-Driven-Transmission Mechanism of which the following is a full, clear, and exact description, such as will enable others skilled in the art to which it appertains to make and use the same.

This invention relates to transmission mechanism for driving a variable speed generator from a car axle.

It is one of the objects of the invention to provide a dependable and efficient gear and shaft mechanism arranged and operative to transmit driving power from a rotating car axle to a generator.

It is a further object to provide an improved mechanism of the character mentioned, without employing belts and pulleys, wherein a direct drive is established at all times, and wherein liability of disarrangement or injury to the parts arising from sudden or prolonged relative displacement of the car axle and the generator is substantially eliminated.

Another object is to provide a structurally superior and functionally advantageous driving connection between a car axle and a generator supported by the car body.

Other objects and advantages will be in part noted hereinafter in connection with the following description of the accompanying drawings, which illustrate a typical embodiment of the invention, and in which—

Figure 1 is a side view, partially in section, of a driving connection and assembly from a car axle to a generator;

Fig. 2 is a top view thereof, also partially in section, and with certain parts of the car truck indicated in dotted lines;

Fig. 3 is a side view of the upper section of a casing which encloses the driving gears;

Fig. 4 is an end view thereof;

Fig. 5 is a side view of the lower section of the casing;

Fig. 6 is an end view thereof;

Fig. 7 is a plan view of one member, herein called the drum, of the transmission;

Fig. 8 is an elevation of a bearing for one end of the transmission counter-shaft;

Fig. 9 is a sectional view thereof;

Fig. 10 is an elevation of the bearing at the other end of the counter-shaft; and Fig. 11 is a sectional view thereof.

In railway car lighting systems wherein a variable speed generator driven from the car axle is employed to supply current to a storage battery and to lamps, it is desirable, in certain respects, to support the generator from the frame of the car body, thereby decreasing the weight of auxiliary parts mounted on the car truck and reducing the force of shocks or jolts reaching the generator. In certain respects, also, in such systems, it is desirable to provide a direct drive through mechanical connections without belts or other similar devices which are not well adapted to withstand the hard service imposed on car lighting systems and which are otherwise objectionable. It is to be noted, however, that the car axles which are generally utilized as the prime mover are not finished to accurate concentricity, and moreover, are subject to lateral and vertical displacement with respect to any fixed point on the car body while the train is running.

The present invention is directed, generally, to the provision of a driving connection of a sturdy and practical character between the car axle and a body-hung generator end wherein, without employing belts or the like, a smooth transmission of power is effected at all times while the car is running. It is to be understood, however, that certain features of the invention are capable of embodiment and use in other relations, and that certain sub-combinations of the elements hereinafter described may constitute advantageous co-operable combinations in other structures for like purposes.

Referring more particularly to the drawings, there is shown a car axle 1 constituting the prime mover, and a variable speed electric generator 2 driven from the axle and adapted for rigid mounting from the under side of the car body frame. Surrounding the axle 1, according to the present invention, there is provided a tubular drum 3 having a dimension such that there may be a reasonable clearance between the same and the axle. The drum 3 is provided with one or more (in the present instance two) exterior surfaces 4 finished to concentricity and against which a plurality of symmetrically spaced rollers 5 are adapted to bear. The rollers 5 are supported on stubs mounted in the side walls of a casing 6 which encloses the drum 3 and the other gears, as will be described. This casing 6 may be rigidly mounted on the car truck and positioned so that the rollers 5 support the drum 3 concentric to a relatively fixed axis independently of the axle 1. The bearing portions 4 of the drum also project through the sides of the casing and an oil-retaining bearing 7 is provided therebetween. Flexible members are employed to transmit the rotary motion of the axle to the drum 3 and for this purpose a plurality of springs 8 are stretched between symmetrically spaced extending lugs 9 at the end of the drum, and lugs 10 on collars 11 clamped or otherwise fixedly secured to the axle 1 adjacent the car wheels. It will be observed that the collars 11, which are preferably split, may be readily fastened to the car axles and that the true concentricity of the collars with respect to the axis of the car wheels is unnecessary. The springs 8 at the two ends of the drum are balanced and are properly designed to effectively but somewhat resiliently transmit the drive from the axle to the drum, while, however, permitting a relative longitudinal displacement between the latter and the axle so that side sway of the axle or its other displacement in a horizontal plane is permitted without disturbing the drive or the predetermined axis of rotation of the drum. Such longitudinal displacement is further permitted by the wide spaces 4 of the drum against which the rollers 5 bear.

Intermediate the ends of the drum there is provided a large gear 12, preferably separately made in split form and adapted for rigid attachment to the drum. Gear 12 meshes with a smaller but wider gear or pinion 13 keyed on a counter-shaft 14 extending parallel to the axis of rotation of drum 3 and journaled in bearings through the side walls of the casing 6. Also keyed to counter-shaft 14 and in fixed longitudinal relation to the gear 13 there is provided a bevel gear 15 arranged to mesh with a corresponding but smaller bevel gear 16 fixed to the inner end of an intermediate driving shaft 17, the latter being journaled at one end through the casing 6 and at the other through a supporting plate 18 attached to a truck end sill 19.

From the foregoing it will be observed that a dependable driving connection is established from the axle 1 to the shaft 17 and that the mesh and co-operation of the gears 15, 16 and the gears 12, 13 is not disturbed by slight vertical, horizontal or angular displacement between the axle and the drum 3.

The shaft 17 is connected, through a universal joint 19', to one end of a multi-part extensible shaft 20, the opposite end of the latter being also connected, through a universal joint 21, to the armature shaft 22 of the generator 2. Shaft 20, as mentioned, comprises two parts suitably connected to rotate together and telescopically relatively movable so that a decrease or increase in the distance from the axis of motion of the drum 3 to the fixed extremity of the generator shaft 22 is permitted. The universal joints 19' and 21 also allow angular displacement between the axis of shaft 17 and the generator shaft 22 without disturbing the drive.

The casing 6 is horizontally divided and comprises an upper section 23 and a lower section 24. These sections are complementary and adapted for attachment by bolts through side plates to enclose the several gears and to afford bearings for the counter-shaft 14 and the driving shaft 17. Further, the bearings for the counter-shaft 14, though located between the sections of the casing, are not split but are separate, as shown in Figs. 8 to 11 and are adapted for bolt attachment to the upper casing 23, so that, by disconnection of the casing sections the lower part 24 may be removed without disturbing the assembly and support for the gears 13 and 15. Likewise the upper casing section 23 is provided with a tubular end 25 to which is secured a bearing collar 26 and through which the shaft 17 is journaled on suitable anti-friction devices. Thus the removal of the lower section of the casing may be accomplished for inspection of the gearing, or when otherwise desired, and by further removing the lower part of drum 3 and disconnecting springs 8, the axle may be taken off without necessitating the removal of the main parts of the driving mechanism and without disturbing the alignment or mesh of the various gears.

The counter-shaft 14, at one end, is provided with a bearing 27 which is freely movable in an axial direction in the bearing cap 28 (Figs. 10 and 11) bolted to the casing 6. The other end of the counter-shaft has a bearing 29 clamped between its collar 30 (Figs. 8 and 9) and a cap 31, the latter being bolted to the former and the former in turn bolted to the casing. By varying the position of member 30, therefore, through washers or otherwise, with respect to the casing wall to which it is bolted, the axial position of the counter-shaft 14 may be adjusted to compensate for wear between the gears 15, 16, or for other purposes. The far end of the intermediate shaft 17 is also provided with a bearing 32, and the plate 18 with a collar 33 bolted thereto, affords an oil-retaining casing for the bearing mentioned.

The drum 3 as described, and as shown in Fig. 7, is preferably axially split to comprise two sections with interfitting portions held together by longitudinally extending bolts or pins 34, and the gear 12 is likewise split, whereby the two are easily assembled and clamped against relative rotation.

The construction and assembly of the parts for effecting the drive from the axle to the gear 12, as hereinabove described, constitute the subject-matter of an application filed by Harold Pender on the 7th day of July, 1919, Serial No. 294,933.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In combination, a tubular drum, a rotative axle extending continuously through said drum and operatively connected therewith, an external gear on said drum, a counter-shaft having its axis parallel to the axis of said drum, a relatively wide pinion on said counter-shaft meshing with said gear, a bevel gear on said counter-shaft, a driving shaft having its axis at right angles to the axis of said counter-shaft, a bevel gear thereon meshing with said first-mentioned bevel gear, and a casing enclosing said drum and gears and supporting said countershaft.

2. In combination, a rotative axle, a drum spaced thereabout and resiliently connected therewith and having an external gear, a horizontally split sectional casing enclosing said drum, a counter-shaft, tubular bearings therefor supported by the upper section of said casing, and a pinion on said counter-shaft meshing with said gear.

3. In combination, a split tubular drum, a rotative axle extending continuously through said drum and operatively connected to rotate with said axle, an external gear on said drum, a horizontally split casing enclosing said drum, a counter-shaft having a pinion meshing with said gear and having a bevel gear, a driving shaft having a bevel gear meshing with said first-mentioned bevel gear, said counter-shaft and driving shaft having bearings supported by the upper section of said casing.

4. In combination, a rotative axle, a shaft disposed at right angles thereto, a train of gears between said axle and said shaft, one of said gears being resiliently connected to said axle, and a horizontal split casing enclosing said train of gears, the upper section of said casing having a tubular end at the dividing line between the upper and lower sections affording a bearing for said shaft.

5. In combination, a rotative axle, a counter-shaft extending parallel thereto, a gearing between said axle and shaft, and a casing enclosing said gearing and supporting said counter-shaft, said casing being constructed at one side to support the corresponding end of said counter-shaft in adjustable relationship therein, and being constructed at its opposite side to control the longitudinal positioning of said counter-shaft and at the same time to control the adjustment of said corresponding end of said counter-shaft in its support.

6. In combination, a rotative axle, a split tubular drum thereabout and operatively connected therewith, a split gear secured to said drum, a horizontally split casing enclosing said drum and gear, and means carried by said casing to hold said drum concentric to a relatively fixed axis while permitting relative longitudinal displacement between said casing and said drum.

7. In combination, a tubular drum, a rotative car axle extending continuously through said drum and connected therewith and having an external gear, a counter-shaft parallel to said axle and having a relatively wide pinion meshing with said gear, a bevel gear on said counter-shaft, and a driving shaft at right angles to said counter-shaft and having a smaller bevel gear meshing with said first-mentioned bevel gear.

8. In combination, a car axle, a generator, means including a counter-shaft substantially parallel to said axle and a shaft at right angles to said counter-shaft for transmitting power from said axle to said generator, and means manipulative at one end only of said counter-shaft to permit longitudinal adjustment of the latter.

9. In combination, a rotative axle, a counter-shaft extending parallel thereto, a gearing between said axle and shaft and a casing enclosing said gearing and supporting said counter-shaft, a bearing on one end of said counter-shaft and movable axially with the latter, said casing being constructed at one side to adjustably receive said bearing, and being constructed at its opposite side to control the longitudinal positioning of said counter-shaft and at the same time to control the adjustment of said bearing.

10. In a power transmission system for axle driven generators, in combination, a split tubular drum, a unitary rotative axle extending through said drum and operatively connected thereto to rotate therewith, an external gear carried by said drum, a counter-shaft having its axis parallel to the axis of said drum and carrying a pinion meshing with said gear, and a casing enclosing said drum and gears and supporting said counter-shaft.

In testimony whereof I affix my signature, in the presence of two witnesses.

GEORGE EGBERT HULSE.

Witnesses:
H. WATSON,
J. THOMSON.